United States Patent [19]

May

[11] 4,121,544
[45] Oct. 24, 1978

[54] INTERNAL COMBUSTION ENGINE

[76] Inventor: Michael G. May, CH 1180 Rolle, Bel Air, Switzerland

[21] Appl. No.: 767,188

[22] Filed: Feb. 9, 1977

Related U.S. Application Data

[63] Continuation-in-part of Ser. No. 630,624, Nov. 10, 1975, Pat. No. 4,094,272.

[30] Foreign Application Priority Data

Jan. 24, 1975 [IT] Italy ............................................ 19596
Apr. 5, 1976 [DE] Fed. Rep. of Germany ........ 2614595
Feb. 13, 1976 [GB] United Kingdom ................. 05787/76

[51] Int. Cl.$^2$ ................................................ F02B 3/00
[52] U.S. Cl. ................................. 123/30 D; 123/30 C; 123/191 M; 123/191 S
[58] Field of Search .................. 123/30 P, 30 C, 32 C, 123/32 D, 32 SP, 32 ST, 75 B, 188 M, 191 S, 191 SP, 191 M, DIG. 4

[56] References Cited

U.S. PATENT DOCUMENTS

| 1,733,696 | 10/1929 | Ricardo | 123/30 C |
|---|---|---|---|
| 1,998,708 | 4/1935 | Cambell | 123/32 SP |
| 2,652,039 | 9/1953 | Westlake | 123/75 B |
| 2,746,433 | 5/1956 | Nullinger | 123/32 C |
| 2,760,478 | 8/1956 | Boghette | 123/191 M |
| 2,763,254 | 9/1956 | Klug | 123/191 M |
| 2,799,257 | 7/1957 | Stumpfig et al. | 123/32 SP |
| 2,986,129 | 5/1961 | Henry-Biaboud | 123/191 M |
| 4,000,722 | 1/1977 | May | 123/32 C |

FOREIGN PATENT DOCUMENTS

898,404 6/1962 United Kingdom ................. 123/30 C

Primary Examiner—Charles J. Myhre
Assistant Examiner—David D. Reynolds
Attorney, Agent, or Firm—Edwin E. Greigg

[57] ABSTRACT

A spark plug ignited internal combustion engine in which each cylinder is provided with a turbulence chamber in which the exhaust valve is located. The cylinder head and the top of the piston cooperate during the compression stroke to define a guide channel through which combustible gases are introduced in off center manner to the turbulence chamber where a substantially single vortex flow is created. The spark plug is preferably located so that the sparking electrodes are in the turbulence chamber or nearby in the guide channel and are in close proximity to the top of the piston at TDC. In one embodiment, the inlet valve is located in a depression of the cylinder head so configured that, during the initial valve opening, the inflowing gases are constrained to flow toward the center of the combustion chamber, thereby preventing contact with the cylinder walls.

8 Claims, 7 Drawing Figures

INTERNAL COMBUSTION ENGINE

CROSS-REFERENCE TO RELATED APPLICATION

This application is a continuation-in-part of Applicant's copending application Ser. No. 630,624, now U.S. Pat. No. 4,094,272 filed on Nov. 10, 1975.

BACKGROUND OF THE INVENTION

The invention relates to an externally ignited four cycle internal combustion engine in which the fuel-air mixture is formed outside of the at least one cylinder and where each cylinder is provided with at least one dependent outlet valve. The opening to be closed by the outlet valve is disposed in the upper portion of a swirl or turbulence chamber which is located substantially within the cylinder head, and within which the mixture to be combusted is substantially contained when the piston is in its top dead center position. The lower edge of the turbulence chamber within the cylinder head or of the turbulence chamber region within the cylinder head is located at least substantially within a cylindric geometric surface defined by the track of the piston within the cylinder. A dependent inlet valve is disposed outside of the turbulence chamber and it preferably may be the only inlet valve of any particular cylinder.

In a known internal combustion engine of this type (U.S. Pat. No. 2,763,254) the turbulence chamber is very large and overlaps nearly one-half of the cross section of the interior volume of the cylinder and the outlet valve is located in the cylinder head, as are three spark plugs. The top face of the piston is provided with recesses and a median depression is arranged in such a way that, during the compression stroke, gas flows into the two outer end regions of the turbulence chamber and forms vortices which rotate in mutual symmetry and in the opposite sense. This results in high flow losses, a low thermodynamic degree of efficiency and it also requires the presence of three spark plugs and has further disadvantages.

OBJECT AND SUMMARY OF THE INVENTION

Basic to the invention is the problem to create an engine of the type described above having a high thermodynamic efficiency and all the advantages deriving therefrom and which will provide as complete a combustion as is possible so that this engine, among other things, also expels only a very small amount of noxious exhaust constituents, has a low fuel consumption and further advantages that will become apparent from a perusal of this application.

According to the invention, a channel is provided in the cylinder head of an engine of the above-described type or, alternatively, the channel may be in the top of the piston, all of which is believed to be clear to those skilled in the art from a study of the drawings. When the piston is in the top dead center position, this channel creates a guideway, defined by the cylinder head and by the top of the piston, which terminates in the turbulence chamber in an off-center direction, and preferably approximately in a tangential direction, and which further creates a communication between the interior volume region of the cylinder lying below the valve disc of the inlet valve and the turbulence chamber itself. The guideway or channel terminates in the turbulence chamber in a region adjacent to the inlet valve. It is further provided advantageously that the external longitudinal edges of the channel lie adjacent over the whole length to squeezing surfaces (later described herein) defined by the cylinder head and the top of the piston.

This guideway or channel makes it possible that, toward the end of the compression stroke, practically a single substantial rotational flow takes place in the turbulence chamber, the rotational axis of which is approximately coaxial with the outlet valve. It has been shown that a rapid process of combustion is achieved. Furthermore, the flow losses which occur during the compression stroke and during the expulsion of the combusted mixture, are low.

In addition, the engine may be operated with surprisingly lean fuel-air mixtures. The air surplus of the powering mixture can normally be at least 10%, corresponding to an air factor $\lambda$ equal to 1.1, preferably at least 30% ($\lambda = 1.3$). In many cases, it is possible to use mixtures which have an air surplus of at least 40% ($\lambda = 1.4$), preferably at least 50% ($\lambda = 1.5$).

It is further the case that the dispersion of the pressure characteristics in successive cycles is low during steady state operational conditions. The engine has a low fuel consumption, a high specific power and a clean combustion with relatively low concentration of noxious constituents in the exhaust gas. Furthermore, the engine does not tend to "ping", so that it may be operated at relatively high compression ratios, or it may be used with normal fuels at relatively high compressions. The compression ratio can be preferably at least 10:1, or preferably at least 14:1. It is possible in many cases to operate the engine with a compression ratio of more than 15:1 when using fuels with present day octane numbers.

Nevertheless, the engine is inexpensive to manufacture because it does not employ direct fuel injection and it can be embodied with only one inlet valve and one outlet valve for each cylinder. Furthermore, the mass production facilities for four-cycle internal combustion engines without turbulence chambers can be changed over to the manufacture of internal combustion engines according to the invention at relatively low cost since, in the simplest case, only the outlet valve and the cylinder head need to be altered.

It is known that flat head pistons, or pistons having only slightly bulging heads favorably have a minimum heat transfer area. Therefore, it can be suitably provided that the piston used is a flat-head piston or a piston with an only slightly bulging head and that the guide channel and the swirl chamber are provided only in the cylinder head. In addition, this embodiment provides particularly low flow losses.

In order to further improve, i.e., to accelerate the combustion process, it may be suitably provided that, when the piston is in its top dead center position, then preferably at least 80% of the remaining volume of the combustion chamber is formed by the turbulence chamber and by the guide channel.

In general, the fuel mixtures which may be used in the engine can be particularly lean if it is provided that the wall of the turbulence chamber is at least partially uncooled and preferably along its entire circumference in such a way that the wall acquires temperatures of at least 300° C and at most 500° - 600° C during partial and full load operations.

A single spark plug is required for each cylinder in the engine constructed according to the invention. The exact position of the electrodes of the spark plug which in turn defines the position and direction of the spark, has an effect on the combustion process. In particular, it is possible, by suitable disposition of these electrodes, to enhance the combustion process and to cause it to take place particularly rapidly, which has a further advantageous effect on noxious exhaust gas components and further increases the combustion efficiency.

For this purpose, the electrodes of the spark plug may be located within the turbulence chamber but in many cases it may also be suitable to dispose them in the channel close to its terminus in the turbulence chamber. The latter disposition permits a particularly simple constructional location for the spark plug, i.e., the bore for the spark plug may be quite simple and the spark plug may be particularly accessible from the outside of the engine even in complicated mechanical situations, especially when the inlet and outlet valve is actuated by means of push rods guided through the cylinder head as opposed to being actuated by overhead cam shafts.

When the electrodes of the spark plug are located within the turbulence chamber, it has been shown to be particularly favorable if they are close to the edge of the turbulence chamber nearest the top of the piston. This condition can also be obeyed when the electrodes are in the channel; for example when the channel is shallow, the condition is automatically obeyed. When the electrodes are located in the turbulence chamber, it is further particularly favorable if they are so disposed as to be less than 90° upstream of the terminus of the channel in the swirl chamber with respect to the rotational flow therein.

An engine constructed according to the invention makes it possible to use fuel-air mixture having a substantial and generally even an extreme excess of air. If desired, it is possible to detoxicate the exhaust gas by adding thermal and/or catalytic post oxidizers. Thus the invention eliminates the necessity of known installations to provide external air by means of a special pump to the post oxidizer elements in the exhaust gas. For this reason, the exhaust gas detoxicating systems which apply post-combustion of the exhaust gas are substantially reduced in complication and cost. Furthermore, it is not necessary to employ other complicated and power-consuming apparatus to provide the required oxygen for post combustion of the exhaust gas.

If a catalyzer employing a ceramic monolithic core with a multitude of mutually parallel channels is used, these channels may be covered in known manner with catalytically active elements, for example platinum or platinum compounds. Such catalyzers have the advantage of being effective even at relatively low temperatures of 300° to 400° C. They may not be used however, if the fuel contains lead compounds, for example antiknock compounds, because these lead compounds poison the catalyzer. Furthermore, excessively rich fuel-air mixtures cause high exhaust gas temperatures which are also capable of destroying known catalyzers. When such catalyzers are used, the present invention provides the advantage that the high excess of air of the mixture no longer permits the existence of excessively rich fuel mixtures and the attending danger of thermal destruction of the catalyzer.

In previously used thermal reactors for four-cycle internal combustion engines, it has been a disadvantage that no substantial heat capacity is available and only a relatively small free interaction surface is available for interaction with the exhaust gas. For this reason, the efficiency of the known thermal reactors becomes useful only at extremely elevated temperatures which, in turn, requires steps that consume fuel to maintain the high temperatures. In order to overcome these disadvantages, the present invention provides that the monolithic core is no longer used as a carrier for a catalytically active substance, but rather that it be used naked, i.e., without any coating for post combustion of exhaust gases and that the surfaces of its gas channels are formed by the ceramic material of the monolithic core and are a single constructional module. Thus the reactor becomes substantially cheaper than catalytic reactors and is incapable of being poisoned by fuel containing lead, thus permitting the use of fuel of all types without shortening its lifetime. Furthermore, this reactor has a high degree of efficiency because it has an inherent high thermal capacity. Thus, following a cold start of the engine and having been heated by exhaust gas to an overall suitable temperature of at least 650° C, it continues to oxidize with high efficiency even during prolonged overrunning of the engine or idling because its high thermal capacity maintains the minimum temperature required for efficiency. Thus, the reactor operates exclusively or primarily as a thermal reactor although, depending on the type of ceramic material used, it may provide catalytic reactions for post combustion of the exhaust gas. By comparison to previously used purely thermal reactors, the reactor according to the present invention is distinguished by its substantially higher thermal capacity and by the substantially enlarged reaction surface as well as by the prolonged period of time during which the exhaust gas is in contact with the surface of the reactor, thereby achieving much higher degrees of efficiency than are possible in presently known thermal reactors. Furthermore, the reactor according to the present invention is particularly simple and inexpensive to make because it is substantially similar to the carrier core of a known catalytic exhaust gas detoxicator. The reactor herein described is especially advantageous when used in conjunction with the engine according to the present invention but it may also be used in other internal combustion engines.

The invention will be better understood as well as further objects and advantages thereof become more apparent from the ensuing detailed description of several preferred, although only exemplary, embodiments of the invention taken in conjunction with the drawing.

BRIEF DESCRIPTION OF THE DRAWING

Corresponding parts carry the same reference numerals in the drawing.

DESCRIPTION OF THE PREFERRED EMBODIMENTS

Figure 1:
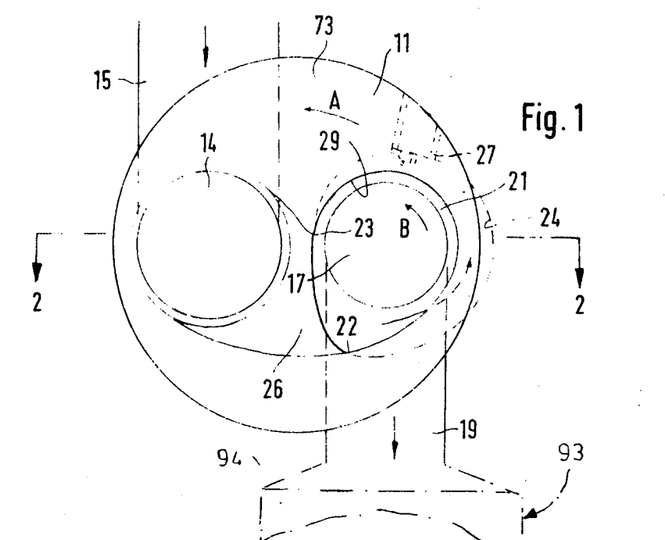
FIG. 1 is a partial sectional bottom view of the cylinder head of a four-cycle internal combustion engine according to a first exemplary embodiment of the invention and the engine may have other cylinders.
Figure 2:
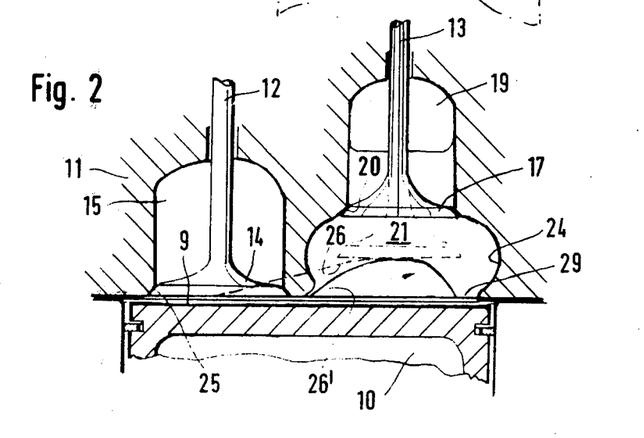
FIG. 2 is a section through FIG. 1 along the section line 2—2 also showing a portion of the cylinder track and the piston.

Turning now to FIG. 2, there is shown a first preferred exemplary embodiment of the invention including a piston 10 having a flat piston head 9. The cylinder head 11 includes an inlet valve 12 and outlet valve 13. The region of the induction tube 15 leading to the space above the valve disc 14 of inlet valve 12 extends approximately perpendicular to the longitudinal axis of the valve 12, as may be seen in FIG. 1 so that, during the suction stroke of the piston, the gas flowing into the combustion chamber preferably has the direction of the arrow A, i.e., it rotates within the cylinder volume and below the cylinder head 11 in the direction of the arrow A. The exhaust line 19 coming from the space above the valve disc 17 of the outlet valve 13 extends approximately parallel to the induction tube section 15.

The outlet aperture 20 associated with the outlet valve disc 17 is disposed in the top of a turbulence chamber 21 wherein the plane of this outlet aperture 20 is suitably approximately parallel to the top of the piston 9. The circumferential wall 24 of this turbulence chamber 21 is approximately semi-circular in cross section and the radius of this semi-circular cross section is substantially smaller than the maximum diameter of the turbulence chamber 21 so that the turbulence chamber 21 has approximately the shape of an oblate sphere. However, it is preferably provided that it is not an exactly flattened-out sphere but that the distance of the circumferential wall of the turbulence chamber 21 from the central axis of the turbulence chamber 21 (which is coaxial with the longitudinal axis of the outlet valve 13) gets uniformly smaller in the circumferential direction from location 22 up to the location 23 so that this circumferential wall runs approximately spirally in the circumferential direction of the turbulence chamber 21.

It may be seen especially clearly from FIG. 1 that, extending from the cylinder inlet aperture 25, which may be closed off by the inlet valve 12, is a channel formed by a channel-like depression 26 which is provided in the surface of the cylinder head 11 facing the top of the piston 9 and which extends up to the turbulence chamber and whose height according to FIG. 2 continually increases from the inlet aperture 25 up to the turbulence chamber 21.

In the top dead center position of the piston 10 as shown in FIG. 2, this channel 26, together with the top of the piston 9, forms a guide channel 26' which, as may be clearly seen in FIG. 1, terminates approximately tangentially in the circumferential wall 24 of the turbulence chamber 21.

The cross section of this guide channel 26' also continually increases from the inlet valve up to the turbulence chamber due to the continuously increasing height. Its width is approximately constant. The terminus of this cavity 26' nearest the turbulence chamber extends up to nearly half the height of the turbulence chamber 21.

The side of this cavity 26' adjacent to the longitudinal axis of the cylinder terminates at the circumferential wall 24 of the turbulence chamber, in a location 23, in the manner of a break-away edge so that the flow entering the turbulence chamber 21 out of this cavity 26' during the compression stroke will break off. The other side of the cavity 26 continuously extends into the circumferential wall 24 of the turbulence chamber 21 at the location 22.

As may be seen in FIG. 1, the channel 26 is arch-shaped and curved and extends in the direction of the rotational flow generated in the cylinder during the suction stroke (arrow A). This can also be described by saying that, in the view shown in FIG. 1, this channel-like cavity 26' starts at that side of the inlet aperture 25 farthest from the induction tube section 15 and it does so not diametrically opposite this induction tube section but is shifted angularly somewhat in the direction of the turbulence chamber 21. This results in a relatively short length of the guide channel 26' which is favorable.

As may be seen in FIG. 2, the combustion chamber volume remaining when the piston 10 is in its top dead center position is determined substantially only by the guide channel 26' and the turbulence chamber 21.

As has been suggested by broken lines, in the fully open position of the outlet valve 11, the outlet valve disc 17 lies at approximately the level of the largest diameter of the turbulence chamber 21; i.e., as shown here approximately at half the height of the turbulence chamber and this disposition is generally advantageous.

Suitably, as may be seen in FIG. 2, the single spark plug 27 is inserted in the circumferential wall 24 of the turbulence chamber 21.

The volume of the channel-like cavity 26 is smaller, and preferably substantially smaller, than the volume of the turbulence chamber 21.

This turbulence chamber 21 is the only turbulence chamber of this cylinder and the inlet aperture 25 is located a small distance above the top of the piston 9 when the piston is in its top dead center position. This improves the expulsion of combusted gases, among other things. Naturally, however, the distance between the top of the piston 9 and the inlet valve disc 14 is sufficiently large that the opening process of the inlet valve 22 may begin in the usual manner before the piston 10 has reached its top dead center position.

It may further be seen from the drawing that the entire lower edge of the lower, relatively large, turbulence chamber opening 29 which is interrupted only by the terminus of the cavity 26, lies opposite the top of the piston 9, so that the flow passage cross section from the cylinder volume region 16, defined by the path of the piston, into the turbulence chamber 21, is not narrowed by the circumference of the cylinder forming the path of the piston and this is especially favorable.

Except for the turbulence chamber 21 and the cavity 26, the remaining region of the cylinder head 11 is so close to the piston 10 in the dead center position of the latter, that a so-called squeezing zone is formed in this entire remaining region.

In addition, the turbulence chamber 21 begins practically immediately at the lower edge of its opening 29 adjacent to the top of the piston 9 so that, in practice, it is immediately adjacent to the cylinder volume.

The following is the method of operation of the sectionally shown cylinder belonging to an externally ignited four-cycle internal combustion engine, not shown in further detail, and whose fuel-air mixture is produced in any known manner outside of the combustion chamber of the cylinder, for example by means of a carburetor or by fuel injection into the induction tube.

During the suction stroke, and in known manner, the downward motion of the piston aspirates a fuel-air mixture into the combustion chamber while the inlet valve is open and the mixture may swirl within the interior cylindrical volume 16 in the direction of arrow A at least for larger amounts of gaseous mixture. During the subsequent compression motion of the piston 10, this mixture is compressed and a slow rotational flow in the direction of the arrow B may possibly already be formed at this time in the turbulence chamber, conditioned by the channel 26, and the rotational axis of this flow is approximately coaxial with the longitudinal axis of the outlet valve 13. Toward the end of the compressional motion of the piston, the top of the piston 9 comes closer and closer to the cavity 26 so that the flow occurring therein is reinforced and a relatively intensive gas flow takes place from the guide channel 26', being formed, into the turbulence chamber 21, where it generates thereby at least an intensive rotational flow in the direction of the arrow B. The spark plug 27 ignites the mixture in known manner at adjustable crankshaft angles during the compressional motion of the piston, i.e., before the piston has reached its top dead center position.

Due to the concentration of the mixture in the turbulence chamber 21 and in the guide channel 26' and due to the orderly rotational flow prevailing, in the same sense, in the turbulence chamber, the combustion process is rapid and a high degree of fuel utilization is achieved. After the piston has passed its top dead center position, it is pushed downwardly and during the next upward motion of the piston, and while the outlet valve is open, the combusted gas is expelled through the turbulence chamber into the exhaust line 19 and in this process the cavity 26 also improves the expulsion of the combusted gases.

An engine constructed as described above may be operated with very lean fuel-air mixtures, further it exhibits a low specific fuel consumption and the exhaust gas contains relatively few toxic constituents, so that in spite of its simple construction and its relatively high specific power, it is compatible with the environment. In addition, the octane number of the fuel may be relatively low.

As preferably provided in this exemplary embodiment, the cavity 26 is located only in the cylinder head. However, in many cases, it may be suitable to form the guide channel 26' by opposite cavities in the cylinder head and the top of the piston, and it ought to be generally suitable to make the depth of the cavity in the cylinder head greater than the depth of the cavity in the top of the piston. In special cases, it is also conceivable that the guide channel 26' may be formed exclusively by a depression or cavity in the top of the piston which is so shaped that toward the end of the compression stroke of the piston, it introduces gas into the turbulence chamber 10 preferably tangentially, so that the gas executes a rotational flow along the circumferential wall 24 of the turbulence chamber or that at least a substantial component of this rotational flow lies along the circumferential direction of the turbulence chamber.

It is also conceivable to provide for example, a spherical indentation or depression in the top of the piston opposite the turbulence chamber 21 and the cylinder head 11 where this depression extends the turbulence chamber down into the top of the piston when the piston is in its top dead center position, but where the depth of this depression in the top of the piston can be suitably substantially smaller than the height of the turbulence chamber in the cylinder head so as to limit the thermal loading of the top of the piston.

Figure 3:
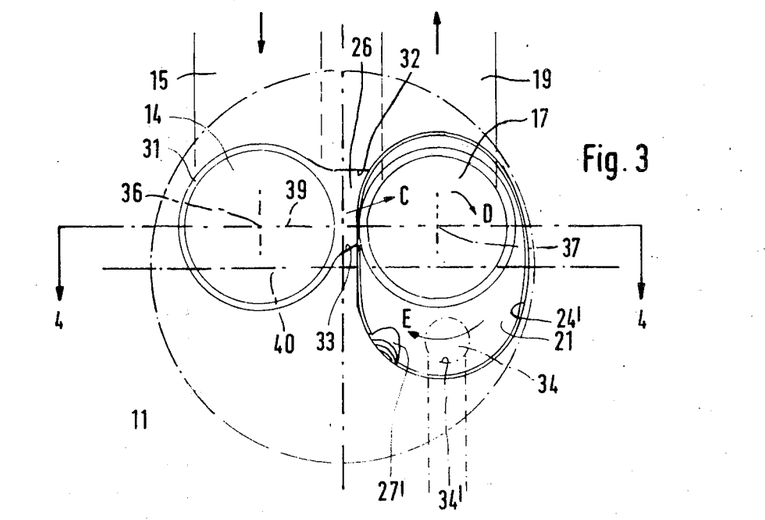
FIG. 3 is a partial sectional bottom view of a cylinder head, similar to that shown in FIG. 1, but according to a second exemplary embodiment of the invention.
Figure 4:
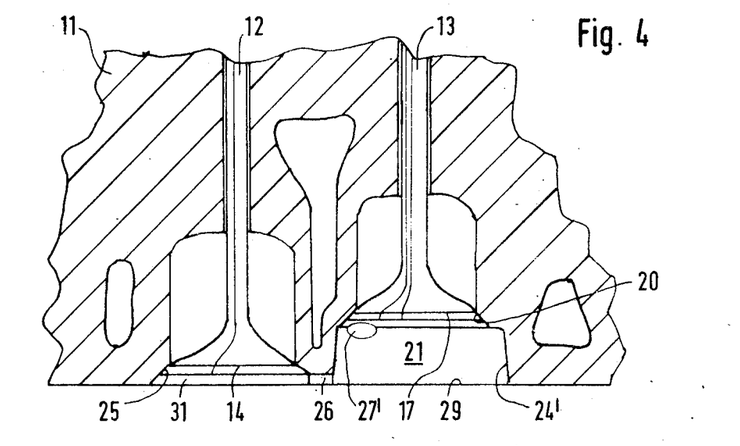
FIG. 4 is a section through FIG. 3 seen along the section line 4—4.

The second exemplary embodiment shown in FIGS. 3 and 4 differs from the first exemplary embodiment according to FIGS. 1 and 2 substantially by the disposition of the valves 13 and 14 with respect to the cylinder axis and especially by the embodiment of the turbulence chamber 21 and of the channel 26''. The inlet opening of the interior volume of the cylinder which may be obturated by the inlet valve 12, is located in a shallow frustoconical depression or chamber 31 in the cylinder head 11 whose maximum diameter is somewhat larger than the diameter of the valve disc 14 of the inlet valve 12. As shown, the longitudinal axis 36 of the inlet valve 12 as well as that axis 37 of the outlet valve 13 may be displaced with respect to a diametral plane 40 of the piston which is parallel to their connecting plane 39. In this connection, it is also to be understood that it is a possible feature of the invention that the inlet and outlet valves are so disposed that the line defined by the centers of the valve disc face portions is displaced from i.e., does not intersect, the central axis of the cylinder or its geometrical extension. In other words, one skilled in this art may construct a cylinder head with valves whose stems are non-parallel, non-vertical and do not lie in the same plane but which still obey the above conditions and thus fall within the scope of this invention. The channel 26'', which leads from the depression or chamber 31 containing the valve disc 14 to the turbulence or second chamber 21 is shown formed by a shallow, broad, channel-like and very short recess in the cylinder head 11 whose cross section may increase or decrease in the direction of the turbulence chamber. This throat area amplifies the impulse of the gas current generated in the channel 26''. This channel is located directly between the inlet opening 25 and the turbulence chamber 21 and is therefore very short. One long edge 32 of the channel 26'' extends substantially parallel to the plane 39 determined by the long axis 36 of the inlet valve 12 as well as the axis 37 of the outlet valve 13, respectively. This imaginary plane 39 passes through the channel 26''. The other long edge 33 of the channel 26'' has a smaller distance from the plane 39 than has the edge 32 and makes an acute angle with the plane 39, such that the cross section of the channel 26'' decreases in the direction of the turbulence chamber 21 and the gas flow is created from the first chamber 31 to the turbulence or second chamber 21 approximately in the direction of the arrow C. The channel 26'', which is open in the direction of the top of the piston over its entire length, and which is asymmetrical with respect to the plane 31, thus terminates in an off-center direction into the turbulence chamber 21 so that the gas flow in the turbulence chamber 21 also flows in an off-center direction according to the arrow C and is formed only toward the end of the compression stroke and thus generates a rotational swirl which flows along the circumferential wall 24' of the turbulence or second chamber 21 according to the arrows D and E. The width of the channel 26'' may be subdivided by at least one longitudinal bridge into several, preferably mutually parallel, partial channels. Toward the end of the compression stroke, the gas located in the first chamber 31 is compressed more rapidly than the gas located in the turbulence chamber so that there is generated a gas flow according to the arrow C.

In the second exemplary embodiment, in which the piston 10 may also be embodied as shown in FIG. 2, the turbulence chamber 21 has a substantially oval cross section. The circumferential wall 24' of the turbulence chamber has a slight taper, the chamber becoming smaller toward the top. The taper extends over the entire height of the turbulence chamber. The slight taper of the walls of the turbulence chamber and the absence of an interior recess permit the easy removal of the mold plug when the cylinder is made by die casting. In addition, the slightly tapering shape of the turbulence chamber has beneficial effects on the combustion process, the thermal efficiency and reduces the concentration of deleterious exhaust components. However, in many cases, it may also be suitable to provide a substantially circular cross section. The opening for the outlet valve 13 according to FIG. 3, is disposed eccentrically with respect to the central axis of the turbulence chamber 21 and the median transverse plane of the turbulence chamber 21 lies parallel to the diametral plane 40 of the cylinder.

The bore 27' for the single spark plug terminates in the corner lying between the cylindrical wall 24' and the top of the turbulence chamber 21 and is located in a region adjacent to the edge 33 of the channel 26''. All of the regions of the cylinder head 11 are squeezing surfaces except the turbulence chamber 21, the channel 26'' and the shallow first chamber 31.

According to a variant, shown dash-dotted in FIG. 3, the cylinder may be provided with an inlet 34' for fuel-air mixture, located in the turbulence chamber 21 and closable by a second inlet valve 34, and whose cross section is smaller than the cross section of the first inlet valve 12. In that case, the first inlet 25, closable by means of valve 12, can serve for the inlet of pure air, so that all the fuel is inducted through the second inlet valve 34. This results in a particularly complete and rapid combustion of the fuel-air mixture so that the advantages of this engine are still further enhanced.

In some cases, one may also suitably provide that fuel-air mixture flows through both inlets 25, 34' where however, in general, the mixture flowing in through the inlet 34' should be richer than the mixture flowing through the inlet 25.

In the exemplary embodiment shown, the cross section of the channel 26'' either decreases or increases in the direction of the turbulence chamber. However, in many cases, it could be suitably provided that this cross section is made approximately constant, and preferably that the height and the width of this channel 26'' be approximately constant.

The term "squeezing surfaces" of the cylinder head or of the top of the piston refers to those regions of these parts which lie at the smallest possible distance from one another when the piston is in the top dead center position. This distance is normally only as large as required to prevent contact by the top of the piston with the cylinder head during the operation of the engine.

It is not necessary to provide additional guide channels in addition to the guide channel according to the invention which would originate in the inlet valve and terminate in the turbulence chamber. But the invention is not limited in this regard, so that, if necessary, one or several supplementary channels could be provided within the cylinder head or the top of the piston which would be open in the direction of the top of the piston or the cylinder head and which would lead to the turbulence chamber.

Figure 5:
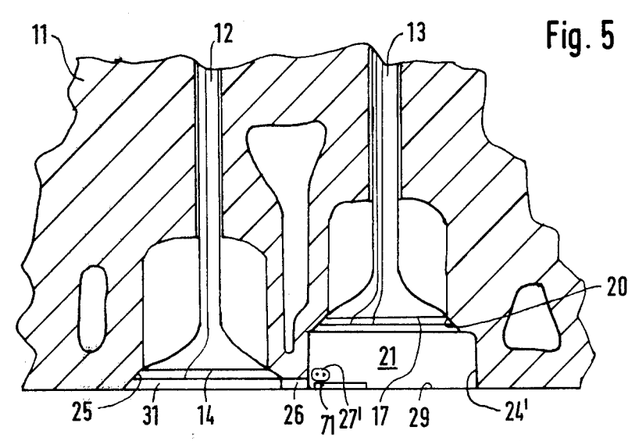
FIGS. 5 and 6 represent variants of the embodiment of FIG. 3.
Figure 6:
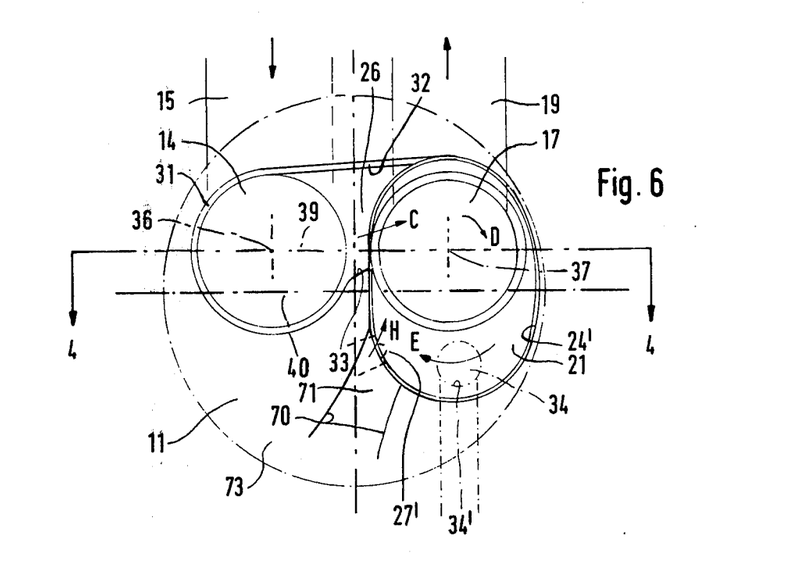

The exemplary embodiment according to FIGS. 5 and 6 corresponds to that according to FIGS. 3 and 4, with the following differences: the longitudinal edge 32 of the guide or ducting channel 26 is displaced a little further outwardly so that, as illustrated, it forms an approximately tangential connection between the depression 31 and the turbulence chamber 21. The circumferential wall 24' of the turbulence chamber 21 is substantially cylindrical.

The spark plug 27' is moreover brought as close as possible to the edge of the turbulence chamber 21 adjacent to the piston head, so that its electrodes are only a small distance away from the lower edge of the turbulence chamber which is particularly advantageous for a rapid and complete combustion of the mixture.

As illustrated, the electrodes of the spark plug are situated less than 90° upstream of the opening of the channel 26, with respect to the swirling flow D,E engendered in the turbulence chamber. This has the favorable result of rapid combustion of the mixture in the turbulence chamber. As illustrated, this angular spacing may in particularly advantageous manner amount to even less than 45° (with respect to the direction of rotation D,E). As a rule, the closer the electrodes of the spark plug are situated to the adjacent side of the opening of the channel 26 into the turbulence chamber 21, the better, said side being upstream with respect to the direction of rotation D,E.

It is further provided that a shallow depression 71 which is delimited by two longitudinal edges 70 is so arranged that it opens approximately tangentially into the turbulence chamber 21, and is located in the squeezing surface 73 of the cylinder head, i.e., that surface which forms a squeezing zone with the piston at the TDC position. This shallow depression 71 is open toward the piston head and may preferably be so constructed that its depth is a maximum at the opening into the turbulence chamber 21 and, in the direction leading away from the turbulence chamber 21, it diminishes steadily to 0, so that it merges evenly into the squeezing zone. The maximum depth may preferably amount to 1 to 1.5 mm. If appropriate, even smaller values may be advantageous. Together with the piston head, when the same approaches its TDC position and, in particular when it is situated at its TDC position, this depression forms a passage which does not start from the inlet valve but is a passage leading from the squeezing zone into the turbulence chamber 21. Shortly before reaching its TDC position, the piston generates a gas flow which enters the turbulence chamber 21 substantially tangentially to the chamber and flows parallel to the top of the piston in the direction of the arrow H, i.e., in the same direction of rotation as that of the rotary flow induced by means of the guide channel 26', i.e., also rotating in the direction of the flow arrows D,E. This gas flow H reinforces the rotary flow generated by the guide channel 26' in the turbulence chamber 21. The combustion process in the turbulence chamber 21 is thereby further improved.

If applicable, instead of a single depression 71, two or more such shallow depressions recessed into the squeezing surface of the cylinder-head may be provided to open substantially tangentially into the turbulence chamber to secure an even greater intensification of the rotary flow in the turbulence chamber. It should be taken into account, however, that these depressions should not be so shallow as to allow so-called "knocking centers" to form therein, i.e., the mixture present in depressions such as 71, should not tend to undergo spontaneous ignition.

It was discovered that it is particularly advantageous if the total squeezing surface of the cylinder-head, i.e., the surface of the cylinder-head which jointly with the piston head defines the so-called squeezing zone, i.e., the squeezing section 73, is at least substantially and preferably totally uncooled. In the case of a water cooled engine, this means that this squeezing surface 73 is not cooled by means of water passages in the cylinder-head, or, in any event, only along a small surface portion, preferably only in the area of the spark plug. This has the consequence that the generation of hydrocarbons injurious to health is reduced and that fewer hydrocarbons injurious to health are thus present in the exhaust gas.

Figure 7:
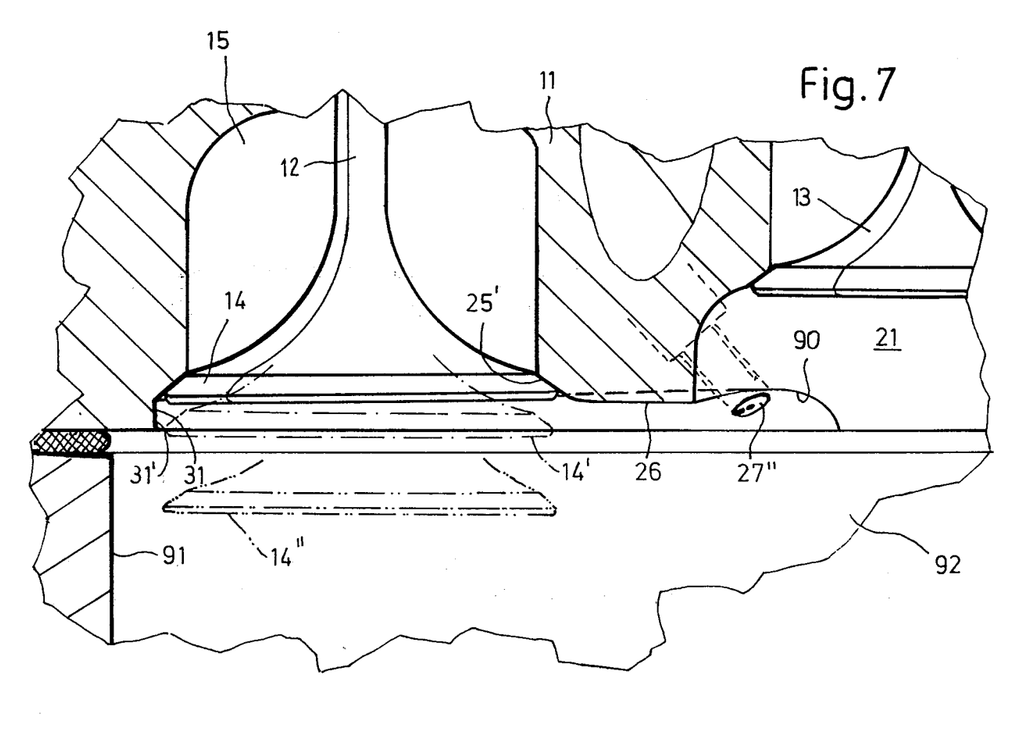
FIG. 7 is a partial longitudinal section through a cylinder according to a further embodiment of the invention.

FIG. 7 is a longitudinal section through a portion of a cylinder of an externally ignited four-cycle engine according to a further preferred exemplary embodiment of the invention. The substantial differences with respect to the previously illustrated and discussed exemplary embodiments will now be recited. In the present exemplary embodiment according to FIG. 7 a single spark plug 27" is so disposed that its electrodes and therefore the path of the spark is not located within the turbulence chamber 21 but rather in the guide channel 26 in the immediate vicinity of its downstream terminus in the turbulence chamber 21. One advantage deriving from this construction is that, at least in many cases, the manufacture of the cylinder head 11 is made simpler with respect to providing a bore for the spark plug 27" than would be the case when the plug is located in the wall of the turbulence chamber 21. Other advantages of this location of the spark plug 27" are favorable effects on the combustion process.

The valve seat 25' which is associated with the valve disc 14 of the inlet valve 12 is disposed at the bottom of an asymmetric and quite shallow depression 31 within the cylinder head. In contrast to the previously illustrated and explained exemplary embodiments, the depression 31 of the present exemplary embodiment has a circumferential wall, the distance of which from the periphery of the valve disc is constant and approximately 0.6 mm over an axial distance as illustrated corresponding to the path of the valve in its motion from closure to the position shown in dash-dot lines and labeled 14'. The remainder of the circumferential wall of this depression 31, with the exception of the necessary interruption due to the location of the terminus of the channel 26, is enlarged obliquely downwardly and outwardly, preferably approximately frustoconically. The remaining circumferential wall 31' may extend from the position nearest the piston track 91 in either direction, preferably between 20° and 40°, and its effect is that, during the suction stroke, the mixture which is admitted into the combustion chamber 92 is forced during an initial and very short period of time when the valve disc 14 is only opened a very small amount to pass through the sharply throttled narrow gap between the valve disc 14 and the circumferential wall 31. Thus, during the initial opening motion of the valve, the mixture flowing into the cylinder is forced to pass through the substantially larger remaining flow cross section. The maximum opening position 14" of the inlet valve disc 12 is shown in dash-double-dotted lines. The present configuration of the depression 31 serves the following purpose. When the inlet valve 12 is closed, it is known that condensed fuel may accumulate upstream and adjacent the inlet valve disc 14, generally on the wall of the induction tube 15. Such condensation is especially to be expected if the engine has not yet attained its operational temperature and it is especially probable if the fuel is admitted to the induction tube continuously, i.e., injected continuously. Because the described construction of the depression 31 forces the greater majority of the mixture to enter the interior space 92 of the cylinder and not to make contact with the piston track, until such time as the valve disc has exceeded the position shown in dash-dot lines and labeled 14', the condensed fuel carried in the mixture is substantially introduced directly to the interior volume 92 without being able to condense on the walls 91 of the cylinder. For this reason, the emission of toxic exhaust gas constituents is reduced during the warm-up phase of the engine operation and the degree of combustion is improved during the same time.

If it is desired to attain a further reduction of noxious components of the exhaust gas while maintaining the high degree of thermal efficiency, i.e., if an exhaust gas detoxication is desired, it is possible to place in the exhaust system 19 (FIG. 1) a reactor 93 illustrated in dash-dot lines in FIG. 1 and shown sectionally. The reactor may have a housing containing a ceramic monolithic core 94 with a multitude of axial mutually parallel gas channels and according to the invention, the free surfaces of the gas channels, which are not shown, are suitably formed by the ceramic material of the monolithic core rather than by separate catalytic substances. In operation, the monolithic core 94 is rapidly heated to at least 650° C by the exhaust gases passing through it and the exhaust gas itself is post oxidized. According to the invention, the oxygen required for the post oxidation process is provided exclusively by the high excess of air of the fuel-air mixture admitted to the cylinders of the engine and no supply of additional external air is required for post oxidation of the exhaust gas.

The foregoing relates to preferred exemplary embodiments of the invention, it being understood that other embodiments and variants thereof are possible within the spirit and scope of the invention, the latter being defined by the appended claims.

What is claimed is:

1. A 4-cycle, externally ignited internal combustion engine comprising:
   cylinder means;
   cylinder head means attached to said cylinder means;
   a piston moving reciprocatingly within said cylinder, thereby defining a combustion chamber of varying geometry;
   an overhead intake valve for closing an inlet opening having a valve seat and which admits a substantially homogeneous combustible charge and is the only inlet means for said engine;
   a chamber in said cylinder head extending said combustion chamber into said cylinder head, said chamber having a depth of penetration into said cylinder head which is less than the lateral extent of said chamber and said chamber having continuous curved walls defining the lateral extent thereof;
   an overhead exhaust valve whose valve disc defines the vertical extent of said chamber in said cylinder head and whose valve seat lies in a plane which is displaced from the plane which includes the seat of said inlet valve;
   and said piston and said cylinder head are disposed to cooperate so that, at top dead center of said piston, said piston head and said inlet valve disc are substantially parallel and so near each other that, during the end of the compression stroke, the top of said piston and said cylinder head cooperate to define a guide channel originating in the vicinity of said inlet valve disc and leading to said chamber and terminating in said chamber in a substantially tangential manner; whereby gaseous charge is accelerated through said guide channel to thereby enter said chamber substantially tangentially and induce therein a substantially unique vortex flow whose axis of rotation is substantially parallel to the longitudinal cylinder axis; said piston and said cylinder head further cooperating in such a manner that, at top dead center, the combustible charge is substantially confined to said chamber and to said guide channel only; and the engine further comprising a spark plug for each of said cylinder means so disposed that the sparking electrodes are located in said turbulence chamber near an edge which is adjacent to the top of the piston at TDC.

2. A 4-cycle, externally ignited internal combustion engine comprising:
cylinder means;
cylinder head means attached to said cylinder means;
a piston moving reciprocatingly within said cylinder, thereby defining a combustion chamber of varying geometry;
an overhead intake valve for closing an inlet opening having a valve seat and which admits a substantially homogeneous combustible charge and is the only inlet means for said engine;
a chamber in said cylinder head extending said combustion chamber into said cylinder head, said chamber having a depth of penetration into said cylinder head which is less than the lateral extent of said chamber and said chamber having continuous curved walls defining the lateral extent thereof;
an overhead exhaust valve whose valve disc defines the vertical extent of said chamber in said cylinder head and whose valve seat lies in a plane which is displaced from the plane which includes the seat of said inlet valve;
and said piston and said cylinder head are disposed to cooperate so that, at top dead center of said piston, said piston head and said inlet valve disc are substantially parallel and so near each other that, during the end of the compression stroke, the top of said piston and said cylinder head cooperate to define a guide channel originating in the vicinity of said inlet valve disc and leading to said chamber and terminating in said chamber in a substantially tangential manner; whereby gaseous charge is accelerated through said guide channel to thereby enter said chamber substantially tangentially and induce therein a substantially unique vortex flow whose axis of rotation is substantially parallel to the longitudinal cylinder axis; said piston and said cylinder head further cooperating in such a manner that, at top dead center, the combustible charge is substantially confined to dsaid chamber and to said guide channel only; and the engine further comprising a spark plug for each of said cylinders so disposed that the sparking electrodes are located less than 90° upstream of the terminus of said guide channel in said turbulence chamber, upstream being defined with respect to said unique vortex flow in said turbulence chamber.

3. A 4-cycle, externally ignited internal combustion engine as defined by claim 1, wherein said curved walls of said turbulence chamber are partially nonparallel and taper toward the top of said turbulence chamber, thereby diminishing the cross section thereof.

4. A 4-cycle, externally ignited internal combustion engine as defined by claim 3, wherein the taper of said curved walls is slight and the diminution of the cross section is small.

5. A 4-cycle, externally ignited internal combustion engine as defined by claim 3, wherein the taper of said curved walls is such as to define substantially a portion of a cone.

6. A 4-cycle, externally ignited internal combustion engine as defined by claim 1, the improvement further comprising that said cylinder head is shaped so that, at TDC, the top of the piston and portions of the surface of said cylinder head cooperate to define gas squeezing zones, these being defined to be zones from which gas is pushed by the piston during its approach to TDC, and wherein the outside edges of said guide channel in said cylinder head merge with said gas squeezing zones, and wherein said gas squeezing zones are at least substantially uncooled.

7. A 4-cycle, externally ignited internal combustion engine as defined by claim 6, wherein said gas squeezing zones extend over the entire surface area of said cylinder head with the exception of the area defined by said turbulence chamber, by said guide channel and by a depression in which said inlet valve is located.

8. A 4-cycle, externally ignited internal combustion engine as defined by claim 1, the improvement further comprising a shallow depression in said cylinder head, said shallow depression containing the disc of said inlet valve when closed, a portion of the wall of said shallow depression remote from the central cylinder axis being substantially vertical and very near to the valve disc edge during the initial opening stroke of said inlet valve; whereby, when said inlet valve opens, the initial flow of gases into the combustion chamber is substantially constrained to pass over portions of said inlet valve disc other than those which are adjacent to said near wall portions of said shallow depression.

* * * * *